July 13, 1937.   J. P. EASTMAN   2,086,703
PRESSED-ON HOSE COUPLING AND METHOD OF APPLYING THE SAME
Filed Sept. 3, 1935   2 Sheets-Sheet 1
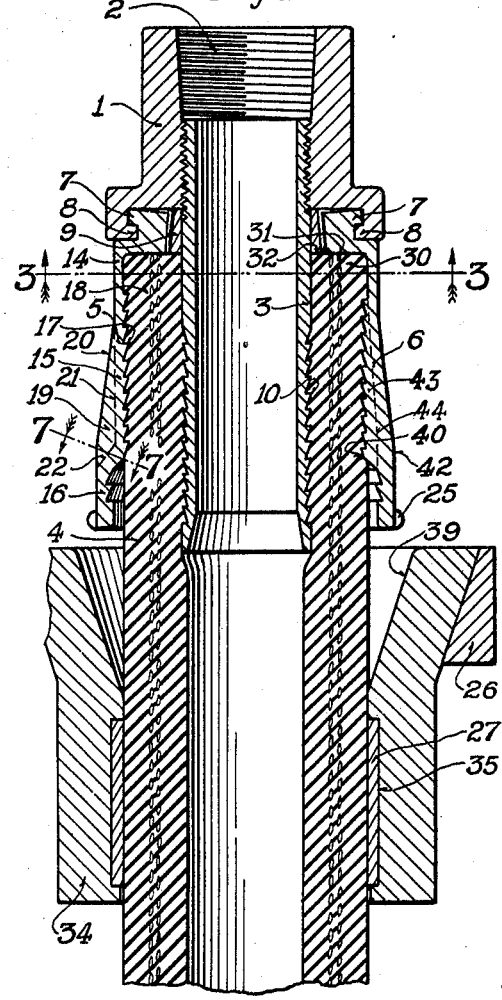
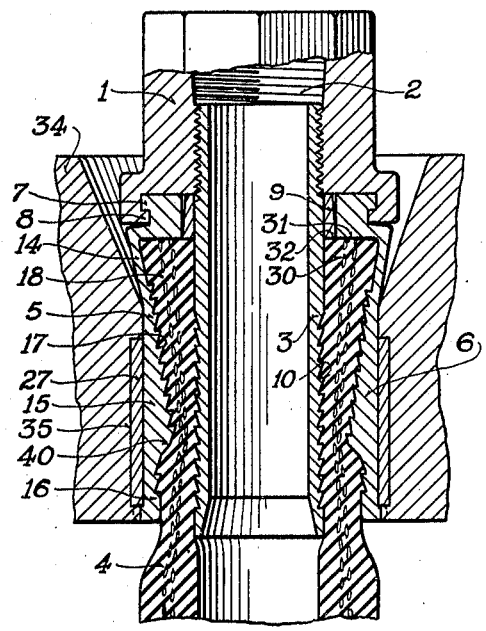
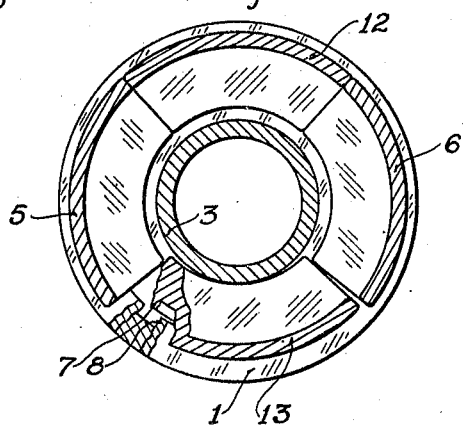
Inventor
J. Peter Eastman Patented July 13, 1937

2,086,703

UNITED STATES PATENT OFFICE 2,086,703

PRESSED-ON HOSE COUPLING AND METHOD OF APPLYING THE SAME

Joseph Peter Eastman, Manitowoc, Wis.

Application September 3, 1935, Serial No. 38,881

7 Claims. (Cl. 29—157)

The invention provides an improved hose coupling of the class known as pressed on couplings.

It is an improvement upon my invention shown in my co-pending application, Serial No. 721,517, filed April 20, 1934, now Patent No. 2,031,823.

It has the same aim in view as the co-pending application aforesaid, namely that of gripping the hose by means of an inwardly protruding "neck-ring", such inward protrusion not existing in the coupling before contraction, it being produced by the throwing inward, during contraction, of metal which is originally provided in the shape of excess metal located in the wall of the sleeve.

But, whereas the co-pending case shows a body and a sleeve integral with each other, said sleeve being split into segments for less than the whole of its length, the present invention provides segments as separate units, co-operating to form a sleeve.

It provides also special means for assembling said segments on the body, designed, first, to allow of the screwing in of the hose before contraction, and, thereafter, to co-operate with the contracting dies in contracting the segments on to the hose.

In the drawings:—

Fig. 1 is a sectional elevation, showing the coupling after insertion of the hose but before contraction.

Fig. 2 is an elevation, partly sectional, after contraction.

Fig. 3 is a cross-sectional view on line 3—3, Fig. 1, the view being taken, however, before insertion of the hose, and before insertion of the spacing ring, showing the hooking of the segments into the body.

Figure 4:
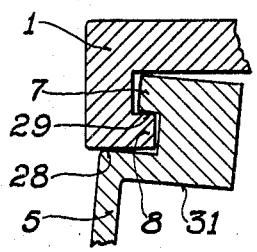
Fig. 4 is a detail, showing, diagrammatically, how the segments are prevented from tilting outward before contraction.

In this description and in the claims, the end at which the joining to other equipment is effected is called the upper end of the coupling; and in the drawings, accordingly, the coupling is drawn with its coupling end upward. This is done for the sake of clearness in description, and it is to be understood that, in use, the coupling may point in any direction.

Referring to the drawings:—

Referring first more particularly to Fig. 1, which shows the parts assembled before contraction:—

The body 1 has at its upper end the female threading 2 for use in joining the coupling to other equipment. Into said body the insert 3 is rigidly fixed as an internal reinforcement to the hose 4. The segment 5 at the left and the segment 6 at the right are hooked into said body by means of co-operating hooks 7 and 8 on the segments and on the body respectively, such interlocking preventing said segments from escaping either downwardly or outwardly at their top ends.

The tapered spacing ring 9, placed in position after said interlocking, prevents said segments from escaping inwardly at their tops.

The barbs 10 are provided on said insert 3.

Fig. 3 shows the segments to be four in number in the preferred form, namely, the segment 5 aforesaid at the left, the segment 12 at the front of the coupling, the segment 6 aforesaid at the right, and the segment 13 at the rear.

Referring again to Fig. 1, each of the four segments comprises an upper portion 14, which is substantially the segment of a cylindrical tube; a middle portion 15, further described hereinbelow; and a lower or "skirt" portion 16, which also is substantially a segment of a cylindrical tube, but of larger diameter than in the case of said upper portion 14.

Said middle portion 15 is, on its inside, before contraction, substantially the segment of a cylinder, and has the coarse threads 17 into which the upper end 18 of said hose 4 has been screwed. On its outside it has the thickening shown at the left of Fig. 1 by the triangle 19, bounded by the line 20 and the dotted lines 21 and 22, which thickening will cause an inwardly protruding neck ring to be formed during the act of contraction, as will be hereinafter described.

Figure 6:
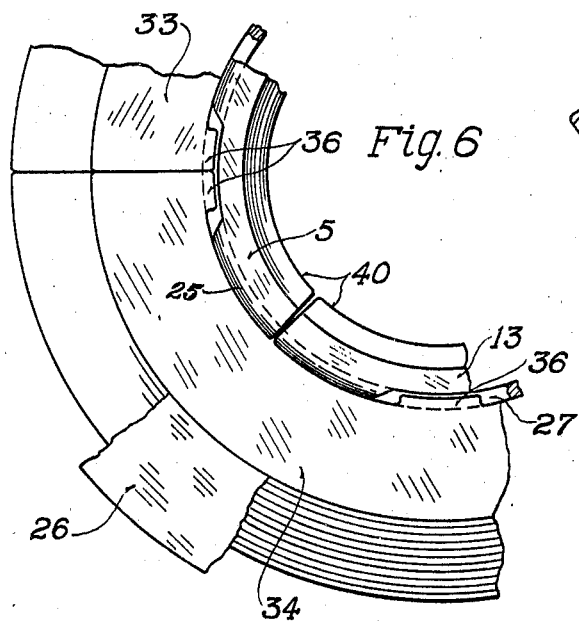
Fig. 6 is a bottom view of the coupling, after contraction, broken away, and with hose and "insert" removed, showing how the encircling band is retained.

Interrupted lengths of beading 25, at the lower end of each segment, seen more clearly in Fig. 6, are for the purpose of retaining the band upon the coupling after contraction, Fig. 2.

Referring more particularly to Fig. 3:—

Three of the four segments, namely, said segments 5, 12 and 6 are, in that figure, shown as having been lifted up against said body and hooked outward and crowded together, leaving room for the fourth segment, namely, said segment 13, to be lifted up against said body, its hook 7 aforesaid being able to pass the co-operating hook 8 aforesaid of said body, as shown in said Fig. 3. Thereafter, in the process of assembling, said segment 13 will be moved outward until hooked at its top, and said spacing-ring 9 will be inserted to prevent the return inward, and consequent unhooking of any of said segments.

The process of assembling and contracting the coupling on to a hose is as follows:—

First, the hose is passed through the die block 26, and through the band 27.

Next, the segments are hooked into place and the spacing ring is inserted, as hereinbefore described in referring to Fig. 3.

Contacting faces at the points 28 and 29, Fig. 4, then prevent the segments from spreading appreciably outward during the screwing of the upper end of the hose into them, as hereinbefore described. Fig. 4 is diagrammatical, and the slope of the said left segment 5 is therein exaggerated in order to make said contact points 28 and 29 show more clearly.

After such screwing in of the hose, the extreme upper end 30 of the hose butts closely against an end wall formed partly by the horizontal shoulders 31 of the segments, Fig. 1, and partly by the lower edge 32 of said ring 9.

Figure 5:
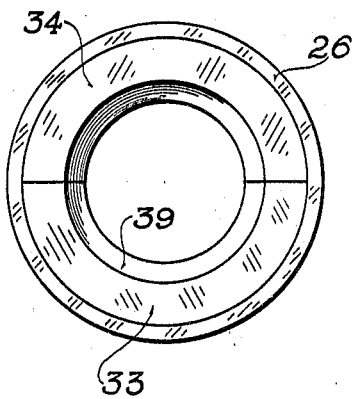
Fig. 5 is a plan view of the dies, with the coupling not shown.
Figure 7:
Fig. 7 is a cross-section of one of the segments, on line 7—7, Fig. 1, showing the weakening groove.

The front half-die 33, Fig. 5, and the rear half-die 34 are then placed around said band 27, so that said band lies in the annular recess 35 counterbored in said half-dies, the bosses 36, Fig. 6, provided on the insides of said half-dies, preventing it from escaping downwards.

Next, said half-dies, taking with them said band, are placed into said die-block 26.

Next, the coupling is forced downward into the die, its lower end leading, causing the lower ends of the segments to be forced inward by the tapered faces 39 of said half-dies. During this portion of the process the segments act as levers, fulcrumed at their upper ends, pressing their shoulders 40 into the substance of the hose.

Continuing the forcing into the die, the final position shown in Fig. 2 is reached, the coupling having been forced right down into the die and into the band.

In that position:—

Said interrupted beads 25 have sprung outward below the band, Figs. 2 and 6. Also the band encircles the segments over the greater part of their length. Also the outsides of the segments, for so much of their length as is covered by the bands have been brought to truly cylindrical form aided by the weakening grooves 41, cut in axial direction in the segments, and due to the increased pressure noted hereinbelow. Also, said shoulders 40, on the insides of the segments, have been caused to form a neck-ring, gripping the hose the more tightly.

Finally, the half-dies are released from the die-block and are removed from around the band, leaving the band to form a permanent part of the coupling, holding the segments tightly against the hose throughout the greater part of their length, with a distributed compression that a solitary, narrow ring could not give. Also under certain conditions a solitary, narrow ring would allow the segments to tilt, and to thereby alter their grip, which tilting the present broad band would not permit.

Fig. 6 shows that said bosses 36 on the inside of the die, and said interrupted beads 25, on the segments, are all in alinement with each other, all of them being just below the lower edge of said band 27, the beads being interrupted where the bosses occur. Continuous beads along the whole widths of the segments would not be feasible, because the bosses could not then be placed where they would touch the band, to prevent it from receding downward during the forcing of the coupling into the die. And, alternatively, a continuous annular ridge, instead of the bosses on the die would prevent the beads from springing into place when the contraction is finished, to retain the band.

In the first stage of compression, while the segments are being used as levers as hereinabove described, only a moderate distance of intrusion into the hose substance is reached by said internal shoulders 40. Later, when the external shoulders 42 of the segments have entered the lower, cylindrical portion of the die cavity, the distance of intrusion is increased. Also the pressure is greatly increased, so much so that it suffices to re-mold the segments to true cylindrical form externally.

That is to say, in the present invention, in order to form the desired "neck-ring", the segments are first used as levers, and are thereafter constricted by encircling means.

The former, or levering, step is essential to applicant's construction. The latter, or constricting step is not essential for its own sake, though usually desirable for its own sake; but in all cases it has to be performed as a means of placing the band in position.

Further regarding the excess metal that eventually forms or causes the "neck-ring":

The coupling as a whole, before contraction, has the bell-mounted appearance of said earlier coupling in Patent No. 2,031,823; and therefore, viewing the coupling as a whole, it is natural to speak of said excess metal as being external, meaning external relative to the upper bore, said upper bore being cylindrical before contraction. See the triangle 19, bounded by the line 20 and the dotted lines 21 and 22, hereinabove described.

But, when one of the present sleeve segments is viewed as an isolated unit, and in cross-section, (as shown at either side of Figure 1) it may give a clearer conception to speak of the sleeve segment as a somewhat crooked bar, used as a lever, and having a segment-shaped lump of excess metal, not on its outside, but on its inward side, meaning inward relative to the imaginary straight line which joins the bottom of its "skirt" portion to its fulcrum centre at its upper end. Such excess lump of metal is indicated at the right of Figure 1 by the triangle 43 defined by the dotted line 44.

It is with the latter conception in mind that certain of the claims of the present case, which refer to the earlier, or leverage, stage of the contraction, are drawn.

That conception is even more applicable when it is noted that, in said earlier construction, the operation of contracting the coupling involves a distinct bending of the tongues at their roots, which roots are, say, two-thirds of the way up the sleeve; whereas in the present form a bending of the sleeve segments at about that distance does not occur, and would be undesirable in the said earlier stage of the contraction, the stage in which the sleeve segments are used as levers.

An advantage over my said earlier design, in Patent No. 2,031,823, in which the sleeve is slit for less than its whole length, is that, in that earlier design, the tongues tend to fracture at their said roots during contraction, which bending disappears under the present construction with its entirely separated segments.

Another advantage is that the present sleeve segments, hinging at their extreme tops, apply their leverage pressure over a greater part of the enclosed length of the hose.

Still another advantage is that the contracting which is due to the encircling pressure of the die, as distinguished from the contraction due to the leverage aforesaid, can be the more easily continued further up the coupling if desired. For this contingency a little extra clearance can be allowed between the segments.

In the present coupling, the body and "insert" account for the major part of the cost, and are capable of use again. With such second use in view, a coupling may be removed from a spoilt hose end as follows:—

First the band will be cut off, releasing the great pressure exerted by the segments. Next the hose will be unscrewed, out from said threads 17. Next a blow will be struck upon the outside of one of the segments near its top, causing said spacing ring 9 to be shattered, it being purposely made of extremely brittle metal, its fragments being then easily shaken out, thus enabling the segments to be unhooked. The body and insert will then remain, ready for use again.

While waiting, pending such re-use, the parts are less liable to damage if the segments are unhooked as just described, rather than left assembled with the ring and the body but without the hose. And it is preferable to destroy a brittle ring to facilitate such unhooking, rather than to have difficulty in abstracting one that will not shatter.

The use of the ring is optional.

I claim:

1. A hose coupling comprising a fulcrum member and a plurality of sleeve segments bearing radially outward against said fulcrum member at their upper ends, ring-neck forming segments, in the shape of segmental inward projections, being provided upon the inward faces of said sleeve segments, extending substantially across the whole of the widths of said faces, and located intermediate of the ends of said sleeve segments, said sleeve segments being adapted to be assembled around a hose, their upper ends to be fulcrumed pivotally in said fulcrum member, and to be pressed inward lever-wise at their lower ends, said ring-neck forming segments being thereby pressed into the substance of the hose to form substantially a ring-neck around the same and to grip it at said neck.

2. A hose coupling comprising a body, a plurality of segmental units together forming a segmented sleeve adapted to surround a hose, and a spacing ring, each said unit having at an end thereof an outwardly extending hook, adapted to engage in an inwardly facing recess provided in said body, and said ring being adapted to be placed inward of said units, after such engagement has been effected, to prevent disengagement, said ring being not rigid with any other part of the coupling.

3. A hose coupling as claimed in claim 2, said ring being made of brittle material, whereby it is adapted to be shattered by a blow on the outside of one of said units, to facilitate the work of taking the coupling apart.

4. A hose coupling comprising a body, a ring, a plurality of segmental units adapted to form together a segmented sleeve to surround a hose, and means for attaching said units to said body, said units having, at their upward ends, inwardly extending segment-formed end-wall portions, said portions forming, in conjunction with said ring, an end wall for substantially the whole of the end of the hose to butt against.

5. A method of applying a coupling, the sleeve of which is divided into segments, to a hose, which method consists in assembling the segments around the hose, in retaining the upper ends of said segments against spreading outwardly, but permitting pivotal movement thereof, then, in forcing the segments into a die, said die having an enlarged, tapering orifice, and said segments being forced into it with their lower ends leading, whereby the die, in gathering such lower ends inward, employs said segments as levers, and applies its power to them at their lower ends only, pressing said segments inward against the hose substance to grip the hose, and, finally, in retaining such segments in such pressed-inward position.

6. A hose coupling comprising a series of segmental units, said units being adapted to be assembled around the end of a hose and to be forced inward to grip the same, means for retaining them in such forced-inward position, said segments, when so assembled, having upper, intermediate, and lower portions at the side of the hose, said intermediate portions having upon each, and extending substantially the whole width of each, a segmental thickening, in the form of an inward ridge, causing said segments to be, at those points, substantially thicker than they are at, and adjacent, their said upper and lower portions, and, after said forcing inward, said segments forming together substantially an inwardly protruding ring, gripping the hose with a neck-wise grip, and adapted to intrude into the substance of the hose, and a circumferentially continuous body portion, said segments and said body portion having interlocking parts whereby said segments are directly attached to said body portion.

7. A method of applying a coupling, the sleeve of which is divided into segments, to a hose, which method consists in assembling the segments around the hose, in retaining the upper ends of said segments against spreading outwardly and against moving inwardly, but permitting pivotal movement thereof, then, in forcing the segments into a die, said die having an enlarged, tapering orifice, and said segments being forced into it with their lower ends leading, whereby the die, in gathering such lower ends inward, employs said segments as levers, and applies its power to them at their lower ends only, pressing said segments inward against the hose substance to grip the hose, and, finally, in retaining such segments in such pressed-inward position.

J. PETER EASTMAN.